(12) United States Patent
Kirkish et al.

(10) Patent No.: US 10,283,958 B2
(45) Date of Patent: May 7, 2019

(54) PROTECTION CIRCUIT

(71) Applicant: Teradyne, Inc., North Reading, MA (US)

(72) Inventors: Brian Kirkish, Algonquin, IL (US); Donald Joseph Nowakowski, Arlington Heights, IL (US); Mark Christopher Cress, Chandler, AZ (US)

(73) Assignee: Teradyne, Inc., North Reading, MA (US)

( * ) Notice: Subject to any disclaimer, the term of this patent is extended or adjusted under 35 U.S.C. 154(b) by 272 days.

(21) Appl. No.: 15/346,230

(22) Filed: Nov. 8, 2016

(65) Prior Publication Data

US 2018/0131180 A1 May 10, 2018

(51) Int. Cl.
*H02H 9/04* (2006.01)

(52) U.S. Cl.
CPC .................. *H02H 9/045* (2013.01)

(58) Field of Classification Search
CPC ...................................... H02H 9/045
USPC ........................................ 361/91.5
See application file for complete search history.

(56) References Cited

U.S. PATENT DOCUMENTS

| | | |
|---|---|---|
| 3,931,548 A | 1/1976 | Barchok |
| 4,347,475 A | 8/1982 | Ullin |
| 5,473,498 A | 12/1995 | Krett |
| 5,736,851 A * | 4/1998 | Noda ............... G01R 31/31924 324/73.1 |
| 6,127,879 A | 10/2000 | Willis et al. |
| 6,498,473 B1 * | 12/2002 | Yamabe ............ G01R 31/3004 324/750.01 |
| 6,570,334 B2 | 5/2003 | Kastner |
| 6,882,513 B2 | 4/2005 | Laraia |
| 6,940,703 B1 | 9/2005 | Kemp et al. |
| 7,098,694 B2 | 8/2006 | Bhattacharya et al. |
| 7,403,030 B2 | 7/2008 | Walker et al. |
| 7,639,467 B2 | 12/2009 | Hou |
| 8,139,329 B2 | 3/2012 | Martin |
| 9,219,420 B1 | 12/2015 | Zhang et al. |
| 2004/0145380 A1 | 7/2004 | Babcock et al. |
| 2005/0068705 A1 | 3/2005 | Nakahara |
| 2008/0062603 A1 | 3/2008 | Richter |
| 2008/0111539 A1 | 5/2008 | Kodera |

(Continued)

FOREIGN PATENT DOCUMENTS

| | | |
|---|---|---|
| CN | 104780682 A | 7/2015 |
| DE | 3123067 A1 | 3/1982 |

(Continued)

OTHER PUBLICATIONS

International Search Report for PCT/US2017/053868, 3 pages (dated Jan. 11, 2018).

(Continued)

*Primary Examiner* — Kevin J Comber
(74) *Attorney, Agent, or Firm* — Choate, Hall & Stewart LLP

(57) ABSTRACT

An example system includes a channel over which signals are transmitted between test equipment and a device under test (DUT); and limiting circuitry to limit a voltage on the channel. The limiting circuitry includes a PN-junction device connected to pass current in response to the voltage on the channel exceeding a limit.

27 Claims, 3 Drawing Sheets

(56) References Cited

U.S. PATENT DOCUMENTS

2009/0206869 A1    8/2009   Ullmann
2012/0206846 A1    8/2012   Sushihara

FOREIGN PATENT DOCUMENTS

EP            035316 A2    1/1990
KR     10-0939980 B1    2/2010

OTHER PUBLICATIONS

Written Opinion for PCT/US2017/053868, 6 pages (dated Jan. 11, 2018).

* cited by examiner

PROTECTION CIRCUIT

TECHNICAL FIELD

This specification relates generally to a protection circuit, such as a clamping circuit, that is configurable to limit a level of a signal or a level of a signal on a communication channel.

BACKGROUND

Automatic Test Equipment (ATE) refers to an automated, usually computer-driven, system for testing devices. A device tested by ATE is generally referred to as a device under test (DUT). ATE typically includes a computer system and one or more test instruments or a single device having corresponding functionality. ATE is capable of providing test signals to a DUT, receiving response signals from the DUT, and forwarding those response signals for processing to determine whether the DUT meets testing qualifications. For example, in some implementations, ATE may be capable of forcing voltage to a DUT and sourcing current to the DUT.

Signals are transmitted between the ATE and the DUT over one or more communication channels (or simply, "channels"). Protection circuits may be used to limit the amount of a signal, such as current or voltage, on a channel in order to protect the ATE or the DUT from damage. Protection circuits that employ resistors to sense current are known.

SUMMARY

An example system includes a channel over which signals are transmitted between test equipment and a device under test (DUT); and limiting circuitry to limit a voltage on the channel. The limiting circuitry comprises a PN-junction device connected to pass current in response to the voltage on the channel exceeding a limit. The example system may include one or more of the following features, either alone or in combination.

The limiting circuitry may comprise a positive limiting circuit to protect the DUT. The positive limiting circuit may comprise: a first diode having a first anode and a first cathode, with the first anode being electrically connected to the channel; a second diode comprising the PN-junction device, with the second diode having a second anode and a second cathode, and with the second anode being electrically connected to the first cathode; and an amplifier having a first input electrically connected to the second anode and a second input electrically connected to the second cathode. A first voltage is at the second cathode and a second voltage is at the second anode, with the second voltage being based on the voltage on the channel, and with the second diode conducting in response to the second voltage exceeding the first voltage. Conduction of the second diode causes current to pass through the diode resulting in a voltage drop across the diode that is relayed to the amplifier via the first and second inputs, with the amplifier for outputting a signal based on the voltage drop. The system may include a comparator comprising a third input and a fourth input, with the third input for receiving a threshold value and the fourth input for receiving the signal from the amplifier. The comparator is to output an indication of a fault based on a comparison of the signal to the threshold. The system may include a voltage generator to provide the first voltage to the second cathode. The first voltage may be adjustable.

The limiting circuitry may comprise a negative limiting circuit to protect the test equipment. The negative limiting circuit may comprise: a first diode having a first anode and a first cathode, with the first cathode being electrically connected to the channel; a second diode comprising the PN-junction device, with the second diode having a second anode and a second cathode, and with the second cathode being electrically connected to the first anode; and an amplifier having a first input electrically connected to the second anode and a second input electrically connected to the second cathode. A first voltage is at the second anode and a second voltage is at the second cathode, with the second voltage being based on the voltage on the channel, and with the second diode conducting in response to the first voltage exceeding the first voltage. Conduction of the second diode causes current to pass through the diode resulting in a voltage drop across the diode that is relayed to the amplifier via the first and second inputs, with the amplifier for outputting a signal based on the voltage drop. The example system may comprise a comparator comprising a third input and a fourth input, with the third input for receiving a threshold value and the fourth input for receiving the signal from the amplifier. The comparator is to output an indication of a fault based on a comparison of the signal to the threshold. The example system may comprise a voltage generator to provide the first voltage to the second cathode. The first voltage may be adjustable.

In an example, the channel is a first channel, and the system further comprises: a second channel over which signals are transmitted between test equipment and a device under test (DUT); and second limiting circuitry to limit a voltage on the second channel, with the second limiting circuitry comprising a second PN junction device connected to pass current in response to the voltage for the second channel exceeding a limit.

An example system comprises: test equipment to test a device under test (DUT) by sending and receiving signals over a channel electrically connected to the DUT; a first limiting circuit to protect the DUT from a first over-voltage on the channel, with the first limiting circuit comprising a first PN-junction device to pass current in response to the first over-voltage on the channel; and a second limiting circuit to protect the test equipment from a second over-voltage on the channel, with the second limiting circuit comprising a second PN-junction device to pass current in response to the second over-voltage on the channel. The example system may include one or more of the following features, either alone or in combination.

The first PN-junction device may comprise, or may be, a diode and the second PN-junction device may comprise, or may be, a diode. The first PN junction device may comprise, or may be, a transistor and the second PN-junction device may comprise, or may be, a transistor.

The first limiting circuit may comprise: a first diode having a first anode and a first cathode, with the first anode being electrically connected to the channel; a second diode comprising the PN-junction device, with the second diode having a second anode and a second cathode, and with the second anode being electrically connected to the first cathode; an amplifier having a first input electrically connected to the second anode and a second input electrically connected to the second cathode; and a comparator comprising a third input and a fourth input, with the third input for receiving a threshold value and the fourth input for receiving a signal from the amplifier, and with the comparator to output an indication of a fault based on a comparison of the signal to the threshold.

The second limiting circuit may comprise: a first diode having a first anode and a first cathode, with the first cathode being electrically connected to the channel; a second diode comprising the PN-junction device, with the second diode having a second anode and a second cathode, and with the second cathode being electrically connected to the first anode; an amplifier having a first input electrically connected to the second anode and a second input electrically connected to the second cathode; and a comparator comprising a third input and a fourth input, with the third input for receiving a threshold value and the fourth input for receiving a signal from the amplifier, and with the comparator to output an indication of a fault based on a comparison of the signal to the threshold.

The test equipment may comprise pin electronics, with the second limiting circuit to protect the pin electronics.

Any two or more of the features described in this specification, including in this summary section, can be combined to form implementations not specifically described herein.

The test systems and techniques described herein, or portions thereof, can be implemented as/controlled by a computer program product that includes instructions that are stored on one or more non-transitory machine-readable storage media, and that are executable on one or more processing devices to control (e.g., coordinate) the operations described herein. The test systems and techniques described herein, or portions thereof, can be implemented as an apparatus, method, or electronic system that can include one or more processing devices and memory to store executable instructions to implement various operations.

The details of one or more implementations are set forth in the accompanying drawings and the description below. Other features and advantages will be apparent from the description and drawings, and from the claims.

DESCRIPTION OF THE DRAWINGS

Like reference numerals in different figures indicate like elements.

DETAILED DESCRIPTION

To test components, manufacturers commonly use ATE (or "testers"). Examples of devices—called devices under test (DUT)—that may be tested by ATE include, but are not limited to, electronic devices, including circuits and electronics, computer hardware and software, computer memory (e.g., dynamic random access memory), digital camera sensors, and so forth In response to instructions in a test program set (TPS), some ATE automatically generates input signals to be applied to a DUT, and monitors output signals. The ATE compares the output signals with expected responses to determine whether the DUT is defective. ATE typically includes a computer system and one or more test instruments or a single device having corresponding functionalities. In some cases, over one or more test channels, the test instrument outputs voltage and/or current to the DUT, and receives voltage and/or current from the DUT. Each test channel may include protection circuitry, examples of which are clamping or limiting circuitry, to protect the DUT and/or the ATE.

Figure 1:
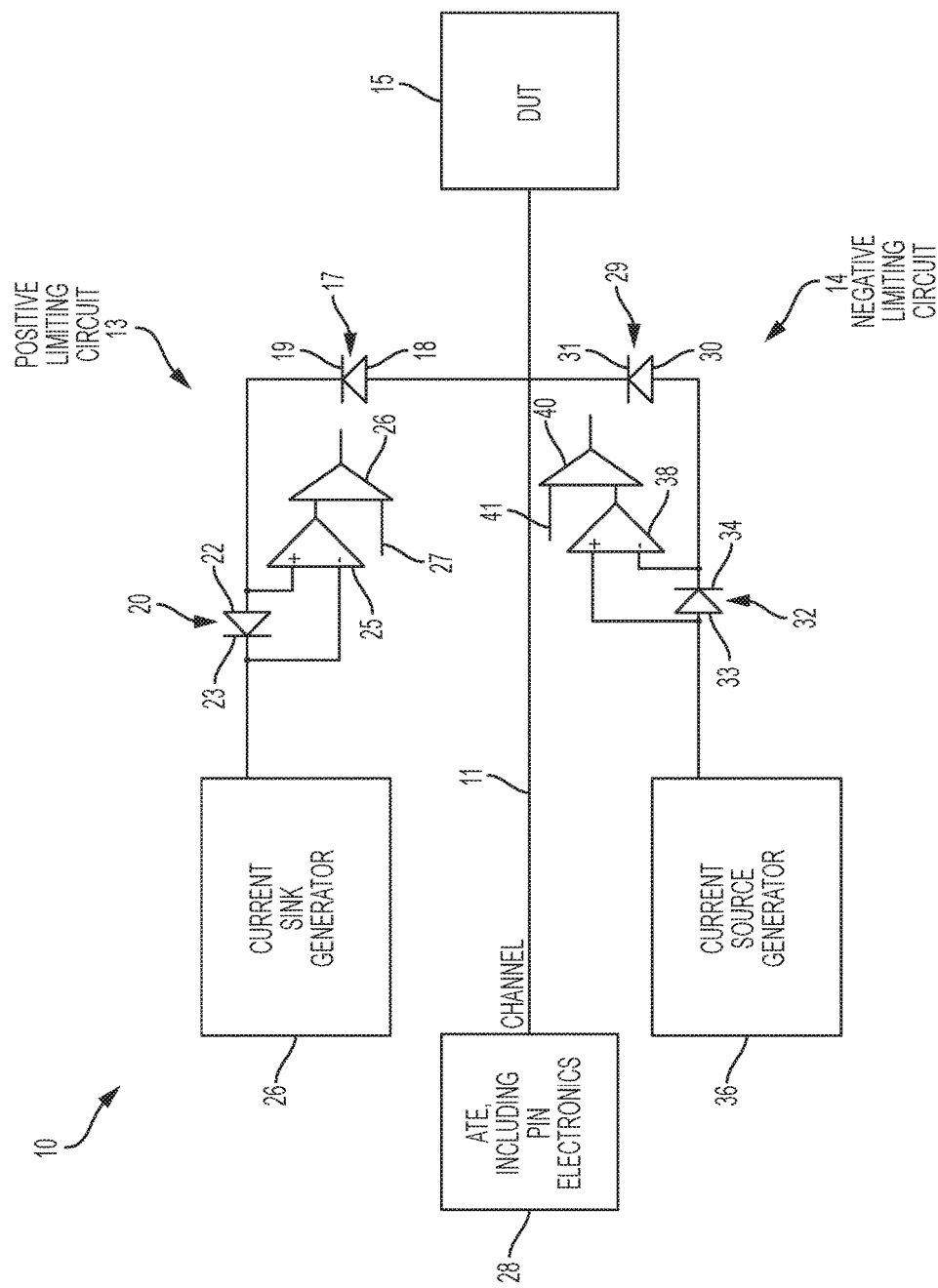
FIG. 1 shows example protection circuitry.

In some implementations, during operation, circuitry in the ATE, such as pin electronics (PE), is configured to force voltage and to source or sink current to a DUT on one or more channels between the ATE and the DUT. Each channel may include protection circuitry. FIG. 1 shows an example of protection circuitry 10 for a channel 11. In this example, protection circuitry 10 includes positive limiting (e.g., clamping) circuit 13 and negative limiting (e.g., clamping) circuit 14. Positive limiting circuit 13 is configured to protect the DUT from over-voltage on the channel, and negative limiting circuit 14 is configured to protect the ATE from under-voltage on the channel. Other implementations may have different configurations than that shown.

In some implementations, the protection circuitry includes circuitry to limit a voltage on the channel, thereby protecting the DUT and the ATE from the effects of over-voltage on the channel. The circuitry includes a PN-junction device, such as a diode or a transistor, connected to pass current based on the voltage on the channel exceeding a limit. The PN junction device is monitored to determine current flow therethrough, and thus whether there is an over- or under-voltage on the channel.

As noted, in some implementations, positive limiting circuit 13 is configured to protect DUT 15 from over-voltage on the channel. In an example, positive limiting circuit 13 includes a first diode 17 having a first anode 18 and a first cathode 19. As shown, the first anode of the first diode is electrically connected to the channel. Positive limiting circuit 13 also includes a second diode 20 that may be the PN-junction device called-out above. The second diode has a second anode 22 and a second cathode 23. As shown, the second anode is electrically connected to the first cathode. Positive limiting circuit 13 also includes an amplifier 25 that is connected across the second diode. For example, the amplifier has its first input electrically connected to the second anode 22 and its second input electrically connected to the second cathode 23.

In operation, a voltage on channel 11 that is applied from the ATE to the DUT (e.g., a positive voltage) appears at the anode of first diode 17. When that voltage exceeds a voltage at the cathode of first diode 17, first diode 17 is driven to conduction, thereby permitting current flow. The initial voltage at the cathode of the first diode may be applied, predefined, or floating. Following conduction, a voltage appears at the anode of second diode 20. That voltage is based on, or about equal to, the channel voltage. When that voltage exceeds the voltage at the cathode of second diode 20, the second diode also conducts, thereby creating a conductive path between channel 11 and a sink current generator 26. Current then flows from the channel, through the first and second diodes, to the sink current generator 26, thereby causing a limitation in the voltage applied to the ATE.

The voltage at the cathode of second diode 20 may be set to any appropriate value. The value of the voltage at the cathode of second diode 20 influences the voltage allowed on channel 11. That is, the voltage at the cathode of second diode 20 acts to limit the voltage on the channel by enabling the conductive path. The specific value of the voltage at the cathode of second diode 20 determines the maximum voltage value to which the channel, and thus the ATE, is subjected.

In the example of FIG. 1, positive limiting circuit 13 includes an amplifier 25 having a first input electrically connected to the second anode and a second input electrically connected to the second cathode. Amplifier 25 amplifies a current signal through second diode 20 by detecting a voltage across the diode and outputting an amplified signal. The resulting signal indicates operation of positive limiting circuit 13. That is, absence of a signal indicates that positive limiting circuit 13 is not currently functioning. In this example, this means that the voltage on the channel has not exceeded an acceptable maximum value for the DUT.

Positive limiting circuit 13 may include a comparator 26 having inputs. The comparators first input receives a threshold value 27 that may be predefined, and its second input for receives the output signal from the amplifier. The comparator compares the output signal to the threshold signal, and outputs an indication based on the comparison. In some implementations, if the amplifier output exceeds the threshold, the output of the comparator indicates a fault, e.g., that there is too much voltage being output from the ATE to the DUT. In some implementations, if the amplifier output is below the threshold, the output of the comparator indicates a fault, e.g., that there is too much negative voltage being output from the ATE to the DUT.

As noted, in some implementations, negative limiting circuit 14 is configured to protect ATE 28 from undervoltage on the channel (e.g., the negative voltage exceeding a maximum absolute value). In this example, negative limiting circuit 14 includes a first diode 29 having a first anode 30 and a first cathode 31. As shown, the first cathode of the first diode is electrically connected to the channel 11. Negative limiting circuit 14 also includes a second diode 32 that may be the PN-junction device called-out above. The second diode has a second anode 33 and a second cathode 34. As shown, the second cathode is electrically connected to the first anode. The second anode is electrically connected to receive current from a source current generator 36. Negative limiting circuit 14 also includes an amplifier 38 that is connected across the second diode. For example, the amplifier has its first input electrically connected to the second cathode 34 and its second input electrically connected to the second anode 33.

In operation, source current generator 36 outputs a current, which results in a voltage at the anode of second diode 32. When the voltage at the anode of the second diode exceeds the voltage at the cathode of the second diode, diode 32 is driven to conduction. As a result, a voltage at the anode of first diode 29 is based on, e.g., equal to, a voltage at the output of the source current generator. Meanwhile, a voltage on channel 11 that is applied from the DUT to the ATE (e.g., a negative voltage) is at the cathode of first diode 29. When the voltage on the anode of first diode 29 exceeds the voltage at the cathode of first diode 29, first diode 29 is driven to conduction, thereby permitting current flow along the path between source current generator 36 and channel 11, including through the two diodes. This current flow acts to limit the voltage applied to the ATE from the DUT.

The voltage at the cathode of second diode 32 may be set initially to any appropriate value. The voltage at the anode of second diode 32 influences the voltage allowed on channel 11. That is, the voltage at the anode of second diode 32 acts to limit the voltage on the channel by enabling the conductive path. The specific value of the voltage at the anode of second diode 32 determines the maximum absolute voltage value to which the channel, and thus the ATE, is subjected.

In the example of FIG. 1, negative limiting circuit 14 includes an amplifier 38 having a first input electrically connected to the second anode and a second input electrically connected to the second cathode. Amplifier 38 amplifies a current signal through diode 32 by detecting a voltage across the diode 32 and outputting an amplified signal. The resulting signal indicates operation of negative limiting circuit 14. That is, absence of a signal indicates that negative limiting circuit 14 is not currently functioning. In this example, this means that the voltage on the channel has not exceeded an acceptable maximum absolute value for the ATE.

Negative limiting circuit 14 may include a comparator 40 having inputs. The comparator's first input receives a threshold 41 value that may be predefined, and its second input receives the output signal from the amplifier. The comparator compares the output signal to the threshold signal, and output an indication based on the comparison. In some implementations, if the amplifier output exceeds the threshold, the output of the comparator indicates a fault, e.g., that there is too much voltage being output from the DUT to the ATE. In some implementations, if the amplifier output is below the threshold, the output of the comparator indicates a fault, e.g., that there is too much voltage being output from the DUT to the ATE.

In some implementations, in both the positive limiting circuit and the negative limiting circuit, relatively small currents may be detected. The actual amount of current that flows may not be significant, but rather the significance is that the current is actually flowing. Sensing across a diode (e.g., the second diodes of the limiting circuits described herein) enables detection of relatively small currents due to the exponential nature of the diodes. In some implementations, in the case of both limiting circuits, the second diode (e.g., diodes 20, 32) normally has no current flowing through it, so there is has no voltage across the diode. There is no clamping action and there is no output of a comparator indicating a fault (e.g., a clamp flag).

Figure 2:
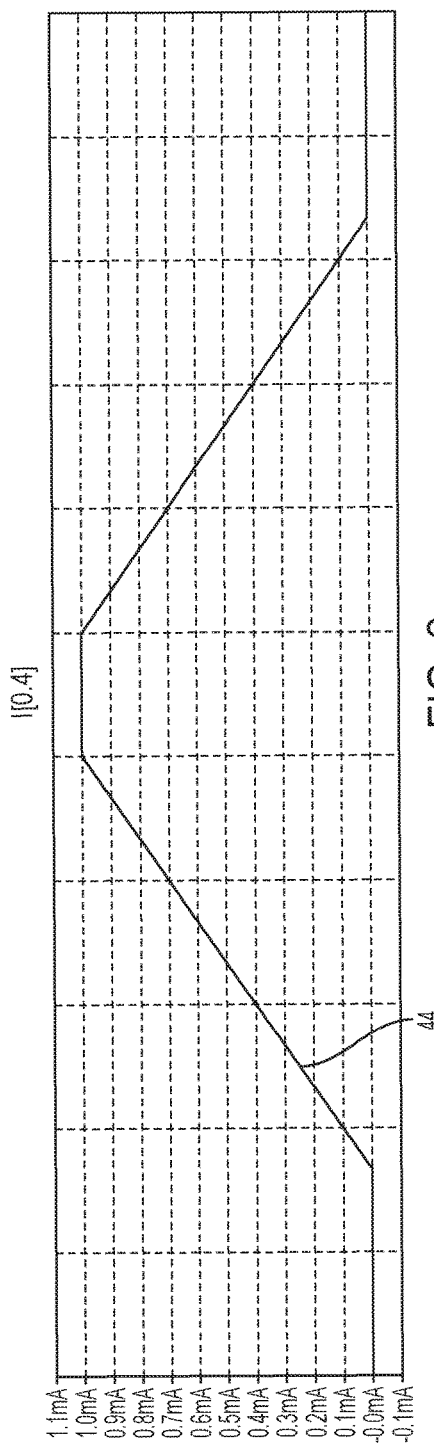
FIG. 2 is a graph showing example current through a diode.
Figure 3:
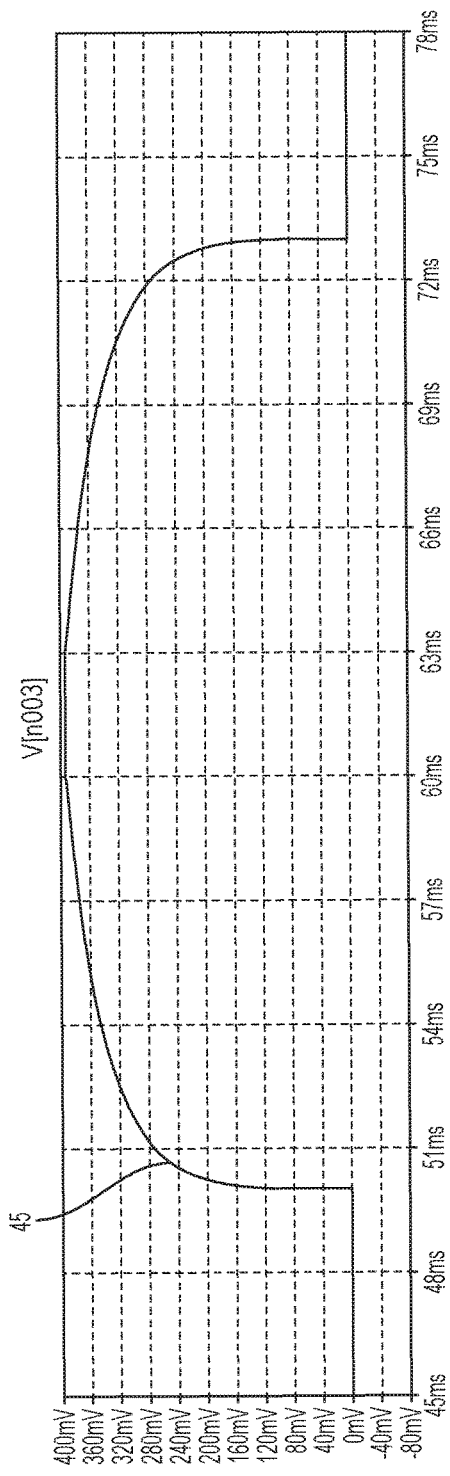
FIG. 3 is a graph showing example voltage across a diode.

In some implementations, a second diode (e.g., diodes 20, 32) will start to conduct with relatively low current flowing through the diode, e.g., less than 10 mA. The logarithmic action of the diode will cause the resulting voltage across the diode to be, e.g., more than 400 mV for relatively low currents. The protection circuitry thus need not measure the value of current, but rather detect when there is any current flow through the second diode. The diode current sense method allows for a non-linear sense, so that relatively little current will cause a greater voltage, which is relatively easier to detect. This is shown, for example, in the graphs of FIGS. 2 and 3, in which FIG. 2 shows current 44 through a diode and FIG. 3 shows corresponding voltage 45 across the diode in response to the current of FIG. 2. Larger currents create voltages that are logarithmic in nature and so power dissipation is limited. By contrast, detecting current using resistor shunts requires a tradeoff between sensitivity and power dissipation due to the linear nature of the resistor (e.g., voltage is directly proportional and linear with current).

In some implementations, medium to high current (e.g., more than 10 mA to 2 A) can flow through the second diode. In some implementations, the logarithmic action of the second diode may cause the voltage to be greater than 1000 mV for high currents. This may help reduce power dissipation caused by the detection circuitry. In some implementations, it may be difficult to detect the difference between 10 mA and 2 A; however, the actual value may not be needed. Rather, the circuitry may operate only to detect that there is some kind of voltage limiting action (e.g., clamping) being performed, and not the actual level of the limiting action.

Accordingly, in some cases, the example protection circuitry described herein allows for relatively low current-level detection for current flow without creating a relatively large drop of voltage at higher currents. This allows for a low-cost differential amplifier and/or comparator to sense that there is some current flowing. By contrast resistive sensing may require a large resistance value to obtain equivalent sensitivity, which may be impractical, particularly at higher currents.

Although the PN-junction device described in the examples presented herein is, or includes, a diode (e.g., the second diode), other PN-junction devices may be used in addition to, or instead of, a diode. For example, an appropriately configured transistor (a type of PN-junction device) may be used.

Furthermore, as noted, the example protection circuitry described herein may be implemented on a single channel between a DUT and ATE. There may be multiple such channels, with each containing its own protection circuitry of the type described herein. Accordingly, each channel may include a first limiting circuit to protect the DUT from a first over-voltage on the channel, with the first limiting circuit including a first PN junction device to pass current in response to the first over-voltage on the channel; and a second limiting circuit to protect the test equipment from a second over-voltage on the channel, with the second limiting circuit including a second PN-junction device to pass current in response to the second over-voltage on the channel.

Figure 4:
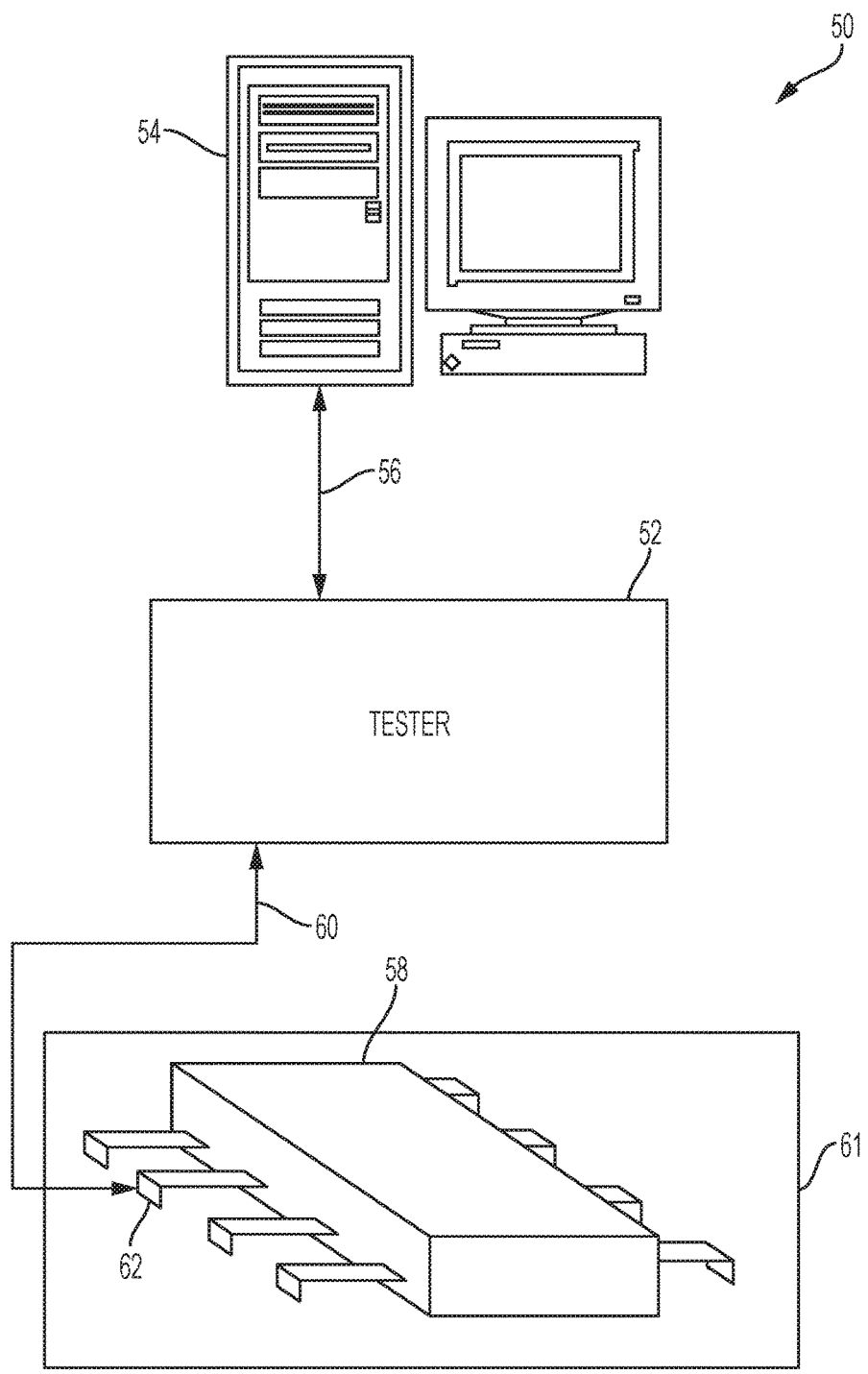
FIG. 4 is a block diagram showing example test equipment that may include the example protection circuitry of FIG. 1.

FIG. 4 shows a general ATE configuration in which the circuitry of FIG. 1 may be implemented. It is, however, emphasized that the protection circuitry described herein is not limited to any particular ATE configuration, including that of FIG. 4, and that the circuitry may be incorporated into any appropriate ATE or non-ATE system.

Referring to FIG. 4, an example ATE system 50 for testing a DUT 58, such as those described herein, includes a tester (or "test instrument") 52. DUT 58 may be interfaced to a DIB 60.

Tester 52 may include a number of channels, each of which may include protection circuitry of the type described herein. To control tester 52, system 50 includes a computer system 54 that interfaces with tester 52 over a hardwire connection 56. In an example operation, computer system 54 sends commands to tester 52 to initiate execution of routines and functions for testing DUT 58. Such executing test routines may initiate the generation and transmission of test signals to the DUT 58 and collect responses from the DUT. Various types of DUTs may be tested by system 50. In some implementations, the DUT may be any appropriate semiconductor or other device, such as an integrated circuit (IC) chip (e.g., memory chip, microprocessor, analog-to-digital converter, digital-to-analog converter, etc.) or other devices.

To provide test signals and collect responses from the DUT, tester 52 is connected to an interface to the internal circuitry of DUT 58. For example, the DUT may be inserted into a socket of DIB 61, which contains interfaces to electrical connections between the DUT and the tester. A conductor 60 (e.g., one or more conductive pathways) is connected to the interface and is used to deliver test signals (e.g., switching or DC test signals, etc.) to the internal circuitry of DUT 58. Conductor 60 also senses signals in response to the test signals provided by tester 52. For example, a voltage signal or a current signal may be sensed at pin 62 in response to a test signal and sent over conductor 60 to tester 52 for analysis. Such single port tests may also be performed on other pins included in DUT 58. For example, tester 52 may provide test signals to other pins and collect associated signals reflected back over conductors (that deliver the provided signals). By collecting the reflected signals, the input impedance of the pins may be characterized along with other single port testing quantities. In other test scenarios, a digital signal may be sent over conductor 60 to pin 62 for storing a digital value on DUT 58. Once stored, DUT 58 may be accessed to retrieve and send the stored digital value over conductor 60 to tester 52. The retrieved digital value may then be identified to determine if the proper value was stored on DUT 58.

Along with performing single port measurements, a two-port or multi-port test may also be performed by tester 52. For example, a voltage signal may be injected over conductor 60 into pin 62 in a force voltage mode, and a response signal may be collected from one or more other pins of DUT 58. This response signal may be provided to tester 52 to determine quantities, such as gain response, phase response, and other throughput measurement quantities. Other tests may also be performed. Tester 52 may source current to the DUT during force voltage mode, as described herein, based on the testing required.

While this specification describes example implementations related to "testing" and a "test system," the circuitry and method described herein may be used in any appropriate system, and are not limited to test systems or to the example test systems described herein.

Testing performed as described herein may be implemented using hardware or a combination of hardware and software. For example, a test system like the ones described herein may include various controllers and/or processing devices located at various points. A central computer may coordinate operation among the various controllers or processing devices. The central computer, controllers, and processing devices may execute various software routines to effect control and coordination of testing and calibration.

Testing can be controlled, at least in part, using one or more computer program products, e.g., one or more computer program tangibly embodied in one or more information carriers, such as one or more non-transitory machine-readable media, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the testing and calibration can be performed by one or more programmable processors executing one or more computer programs to perform the functions described herein. All or part of the testing and calibration can be implemented using special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer (including a server) include one or more processors for executing instructions and one or more storage area devices for storing instructions and data. Generally, a computer will also include, or be operatively coupled to receive data from, or transfer data to, or both, one or more machine-readable storage media, such as mass PCBs for storing data, e.g., magnetic, magneto-optical disks, or optical disks. Machine-readable storage media suitable for embodying computer program instructions and data include all forms of non-volatile storage area, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks.

Any "electrical connection" as used herein may imply a direct physical connection or a connection that includes wired or wireless intervening components but that nevertheless allows electrical signals (including wireless signals) to flow between connected components. Any "connection" involving electrical circuitry mentioned herein through which electrical signals flow, unless stated otherwise, is an electrical connection and not necessarily a direct physical connection regardless of whether the word "electrical" is used to modify "connection".

Elements of different implementations described herein may be combined to form other embodiments not specifically set forth above. Elements may be left out of the structures described herein without adversely affecting their operation. Furthermore, various separate elements may be combined into one or more individual elements to perform the functions described herein.

What is claimed is:

1. A system comprising:
   a channel over which signals are transmitted between test equipment and a device under test (DUT); and
   limiting circuitry to limit a voltage on the channel, the limiting circuitry comprising a PN-junction device connected to pass current in response to the voltage on the channel exceeding a limit;
   wherein the limiting circuitry comprises a positive limiting circuit to protect the DUT, the positive limiting circuit comprising:
      a first diode having a first anode and a first cathode, the first anode being electrically connected to the channel;
      a second diode comprising the PN-junction device, the second diode having a second anode and a second cathode, the second anode being electrically connected to the first cathode; and
      an amplifier having a first input electrically connected to the second anode and a second input electrically connected to the second cathode.

2. The system of claim 1, wherein a first voltage is at the second cathode and a second voltage is at the second anode, the second voltage being based on the voltage on the channel, the second diode conducting in response to the second voltage exceeding the first voltage.

3. The system of claim 2, further comprising:
   a voltage generator to provide the first voltage to the second cathode, the first voltage being adjustable.

4. The system of claim 2, wherein conduction of the second diode causes current to pass through the second diode resulting in a voltage drop across the second diode that is relayed to the amplifier via the first and second inputs, the amplifier for outputting a signal based on the voltage drop.

5. The system of claim 4, further comprising:
   a comparator comprising a third input and a fourth input, the third input for receiving a threshold value and the fourth input for receiving the signal from the amplifier, the comparator to output an indication of a fault based on a comparison of the signal to the threshold.

6. The system of claim 1, wherein the channel is a first channel; and
   wherein the system further comprises:
      a second channel over which signals are transmitted between the test equipment and the device under test (DUT); and
      second limiting circuitry to limit a voltage on the second channel, the second limiting circuitry comprising a second PN-junction device connected to pass current in response to the voltage for the second channel exceeding a limit.

7. The system of claim 1, wherein limiting the voltage on the channel comprises limiting an amount of positive voltage on the channel.

8. A system comprising:
   a channel over which signals are transmitted between test equipment and a device under test (DUT); and
   limiting circuitry to limit a voltage on the channel, the limiting circuitry comprising a PN-junction device connected to pass current in response to the voltage on the channel exceeding a limit;
   wherein the limiting circuitry comprises a negative limiting circuit to protect the test equipment, the negative limiting circuit comprising:
      a first diode having a first anode and a first cathode, the first cathode being electrically connected to the channel;
      a second diode comprising the PN-junction device, the second diode having a second anode and a second cathode, the second cathode being electrically connected to the first anode; and
      an amplifier having a first input electrically connected to the second anode and a second input electrically connected to the second cathode.

9. The system of claim 8, wherein a first voltage is at the second anode and a second voltage is at the second cathode, the second diode conducting in response to the first voltage exceeding the second voltage.

10. The system of claim 9, further comprising:
    a voltage generator to provide the first voltage to the second anode, the first voltage being adjustable.

11. The system of claim 9, wherein conduction of the second diode causes current to pass through the second diode resulting in a voltage drop across the second diode that is relayed to the amplifier via the first and second inputs, the amplifier for outputting a signal based on the voltage drop.

12. The system of claim 11, further comprising:
    a comparator comprising a third input and a fourth input, the third input for receiving a threshold value and the fourth input for receiving the signal from the amplifier, the comparator to output an indication of a fault based on a comparison of the signal to the threshold.

13. The system of claim 8, wherein the channel is a first channel; and
    wherein the system further comprises:
       a second channel over which signals are transmitted between the test equipment and the device under test (DUT); and
       second limiting circuitry to limit a voltage on the second channel, the second limiting circuitry comprising a second PN-junction device connected to pass current in response to the voltage for the second channel exceeding a limit.

14. The system of claim 8, wherein limiting the voltage on the channel comprises limiting an amount of negative voltage on the channel.

15. The system of claim 14, wherein limiting an amount of negative voltage on the channel comprises ensuring that an absolute value of the negative voltage does not exceed a maximum absolute value.

16. A system comprising:
test equipment to test a device under test (DUT) by sending and receiving signals over a channel electrically connected to the DUT;
a first limiting circuit to protect the DUT from an over-voltage on the channel, the first limiting circuit comprising a first PN-junction device to pass current in response to the over-voltage on the channel; and
a second limiting circuit to protect the test equipment from an under-voltage on the channel, the second limiting circuit comprising a second PN-junction device to pass current in response to the under-voltage on the channel;
wherein the first limiting circuit comprises:
a first diode having a first anode and a first cathode, the first anode being electrically connected to the channel;
a second diode comprising the first PN-junction device, the second diode having a second anode and a second cathode, the second anode being electrically connected to the first cathode;
an amplifier having a first input electrically connected to the second anode and a second input electrically connected to the second cathode; and
a comparator comprising a third input and a fourth input, the third input for receiving a threshold value and the fourth input for receiving a signal from the amplifier, the comparator to output an indication of a fault based on a comparison of the signal to the threshold.

17. The system of claim 16, wherein the second PN-junction device comprises a diode.

18. The system of claim 16, wherein the second PN-junction device comprises a transistor.

19. The system of claim 16, wherein the test equipment comprises pin electronics, the second limiting circuit to protect the pin electronics.

20. The system of claim 16, wherein protecting the DUT from an over-voltage on the channel comprises limiting an amount of positive voltage on the channel; and
wherein protecting the test equipment from an under-voltage on the channel comprises limiting an amount of negative voltage on the channel.

21. The system of claim 20, wherein limiting an amount of negative voltage on the channel comprises ensuring that an absolute value of the negative voltage does not exceed a maximum absolute value.

22. A system comprising:
test equipment to test a device under test (DUT) by sending and receiving signals over a channel electrically connected to the DUT;
a first limiting circuit to protect the DUT from an over-voltage on the channel, the first limiting circuit comprising a first PN-junction device to pass current in response to the over-voltage on the channel; and
a second limiting circuit to protect the test equipment from an under-voltage on the channel, the second limiting circuit comprising a second PN-junction device to pass current in response to the under-voltage on the channel;
wherein the second limiting circuit comprises:
a first diode having a first anode and a first cathode, the first cathode being electrically connected to the channel;
a second diode comprising the second PN-junction device, the second diode having a second anode and a second cathode, the second cathode being electrically connected to the first anode;
an amplifier having a first input electrically connected to the second anode and a second input electrically connected to the second cathode; and
a comparator comprising a third input and a fourth input, the third input for receiving a threshold value and the fourth input for receiving a signal from the amplifier, the comparator to output an indication of a fault based on a comparison of the signal to the threshold.

23. The system of claim 22, wherein the first PN-junction device comprises a diode.

24. The system of claim 22, wherein the test equipment comprises pin electronics, the second limiting circuit to protect the pin electronics.

25. The system of claim 22, wherein the first PN-junction device comprises a transistor.

26. The system of claim 22, wherein protecting the DUT from an over-voltage on the channel comprises limiting an amount of positive voltage on the channel; and
wherein protecting the test equipment from an under-voltage on the channel comprises limiting an amount of negative voltage on the channel.

27. The system of claim 26, wherein limiting an amount of negative voltage on the channel comprises ensuring that an absolute value of the negative voltage does not exceed a maximum absolute value.

* * * * *